(12) United States Patent
Knodel (10) Patent No.: US 9,810,387 B2
(45) Date of Patent: Nov. 7, 2017

(54) SOLAR AND FUEL POWERED PORTABLE LIGHT TOWER

(71) Applicant: Jeremy Walter Knodel, Chandler, AZ (US)

(72) Inventor: Jeremy Walter Knodel, Chandler, AZ (US)

(*) Notice: Subject to any disclaimer, the term of this patent is extended or adjusted under 35 U.S.C. 154(b) by 133 days.

(21) Appl. No.: 15/060,567

(22) Filed: Mar. 3, 2016

(65) Prior Publication Data

US 2016/0186945 A1    Jun. 30, 2016

Related U.S. Application Data

(63) Continuation-in-part of application No. 13/429,245, filed on Mar. 23, 2012, now abandoned.

(51) Int. Cl.

| | |
|---|---|
| *B60Q 1/00* | (2006.01) |
| *B60Q 1/26* | (2006.01) |
| *F21L 13/00* | (2006.01) |
| *F21S 9/04* | (2006.01) |
| *B60P 3/18* | (2006.01) |
| *F21L 14/04* | (2006.01) |
| *F21S 9/03* | (2006.01) |
| *F21V 21/26* | (2006.01) |
| *F21V 21/22* | (2006.01) |
| *F21W 131/10* | (2006.01) |
| *F21Y 115/10* | (2016.01) |

(52) U.S. Cl.
CPC .  *F21S 9/04* (2013.01); *B60P 3/18* (2013.01); *F21L 14/04* (2013.01); *F21S 9/03* (2013.01); *F21V 21/22* (2013.01); *F21V 21/26* (2013.01); *F21W 2131/10* (2013.01); *F21W 2131/1005* (2013.01); *F21Y 2115/10* (2016.08); *Y02B 20/72* (2013.01)

(58) Field of Classification Search
CPC ..... B60P 3/18; F21L 14/04; F21S 9/03; F21S 9/032; F21S 9/035; F21S 9/04; F21V 21/26
USPC .......................... 362/183–184, 190–192, 194
See application file for complete search history.

(56) References Cited

U.S. PATENT DOCUMENTS 8,172,438 B2 * 5/2012 Konop ...................... B60P 3/18
362/192

* cited by examiner

*Primary Examiner* — Jason Moon Han (57) ABSTRACT

A solar and fuel powered portable light tower includes a portable base, a light panel arm, a primary power source, a secondary power source, and a control box. The light panel arm, that includes a plurality of light panels, is connected to the portable base while the primary and secondary power sources are positioned within the portable base. The control box, which is positioned within the portable base, controls the solar and fuel powered portable light tower. An insulated wall within the portable base separates the primary power source and the secondary power source for safety purposes. The plurality of light panels is preferably powered the primary power source that includes a plurality of photovoltaic panels and batteries. The plurality of light panels is also powered by the secondary power source that also acts as an onsite generator.

12 Claims, 7 Drawing Sheets

SOLAR AND FUEL POWERED PORTABLE LIGHT TOWER

The current application is a continuation-in-part (OP) application of a U.S. non-provisional application Ser. No. 13/429,245 filed on Mar. 23, 2012.

FIELD OF THE INVENTION

The invention relates generally to an apparatus that provides light to a large area. More specifically, the present invention combines a solar powered energy source and a fuel powered energy source to power portable light tower.

BACKGROUND OF THE INVENTION

Most large scaled operations such as, construction projects, public events, and emergency situations require many different components and devices to complete an assigned task. A portable light tower is one of those component that is essential for large scaled night operations. Existing portable light towers are mainly powered from fuel driven generators/engines. Even though the existing portable light towers are able to provide the sufficient light effects, the existing portable light towers also generate environmental pollution and sound pollution. Since many new construction projects are required to meet LEED (leadership in energy and environmental design) certification in order to achieve healthy work environments, aforementioned large scaled operations need advanced portable light towers that meet the LEED certification.

It is an object of the present invention to introduce a portable light tower that operates through a primary and secondary power source. More specifically, the portable light tower operates with a solar powered energy source, which is the primary power source, while a fuel powered energy source functions as the secondary power source. Both power sources are combined within a single unit/frame to power light panels of the present invention. Since solar power is utilized as the primary power source, the present invention is able to benefit from the renewable resources credits within the commercial construction industry without compromising any functionality of the portable light towers.

In addition to functioning as a backup power source, the secondary power source also able to control the portable light towers in the event that the solar batteries were to drain during operations or were to not charge due to inclement weather, such as cloudy day and rainy day. The combination of the two different power sources also allows the light panels to be powered by the solar powered energy source while the fuel powered energy source is able to operate other electrical devices. As a result of the solar powered energy source, the present invention is able to reduce the environmental pollution compare to continuously operating fuel powered energy source. The present invention also provides a drastic reduction in noise levels through the operation of solar powered energy source while allowing the light panels to lit up during night shifts. The present invention also allows for increased use of renewable resources, such as solar energy, as well as providing a reduced fuel consumption costs and an available option for dual uses such as a simultaneous operational of the light panels and other electronic devices.

DETAIL DESCRIPTIONS OF THE INVENTION

All illustrations of the drawings are for the purpose of describing selected versions of the present invention and are not intended to limit the scope of the present invention.

The present invention is a solar and fuel powered light tower that complies with the renewable energy sources to achieve healthy work environment. In reference to FIG. 1-7, the present invention comprises a portable base 1, a light panel arm 3, a primary power source 5, a secondary power source 7, and a control box 9. In reference to the general configuration of the present invention, the light panel arm 3 is hingedly connected to a top panel 11 of the portable base 1 so that a plurality of light panels 36 of the light panel arm 3 is able to illuminate the worksite. The plurality of light panels 36 is electrically connected with the primary power source 5 and the secondary power source 7 through the control box 9 to allow the continuous operation of the plurality of light panels 36. The primary power source 5 is positioned on the top panel 11 and within a first enclosure 18 of the portable base 1. As a result, the plurality of light panels 36 can be mainly operated through the primary power source 5. The secondary power source 7 is positioned with a second enclosure 19 of the portable base 1 and functions as a backup power source for the primary power source 5.

The portable base 1 is main body of the present invention as multiple components are either housed within or externally positioned in relation to the functionality of the present invention. More specifically, the portable base 1 allows the present invention to be transported from one location to another and selectively power the plurality of light panels 36 through the primary power source 5 and/or the secondary power source 7. In reference to FIG. 2 and FIG. 7, the portable base 1 comprises a front panel 12, a rear panel 15, an insulated wall 17, a trailer frame 20, a first lateral panel 23, and a second lateral panel 24 in addition to the top panel 11, the first enclosure 18, and the second enclosure 19. In order to complete a housing of the portable base 1, the front panel 12 is connected to the trailer frame 20 from an end while the rear panel 15 is connected to the trailer frame 20, opposite of the front panel 12. The top panel 11 is connected to the front panel 12 and the rear panel 15 and positioned opposite of the trailer frame 20. The first lateral panel 23 and the second lateral panel 24 are oppositely positioned of each other along the top panel and extend from the rear panel 15 to the front panel 12. The first lateral panel 23 and the second lateral panel 24 are connected to the top panel 11, the front panel 12, and the rear panel 13 completing the basic structure of the housing. The top panel 11, the front panel 12, the rear panel 15, the first lateral panel 23, and the second lateral panel 24 are made by high strength and light weighted material such as aluminum that can withstand the elevated heat created by the present invention.

Figure 7:
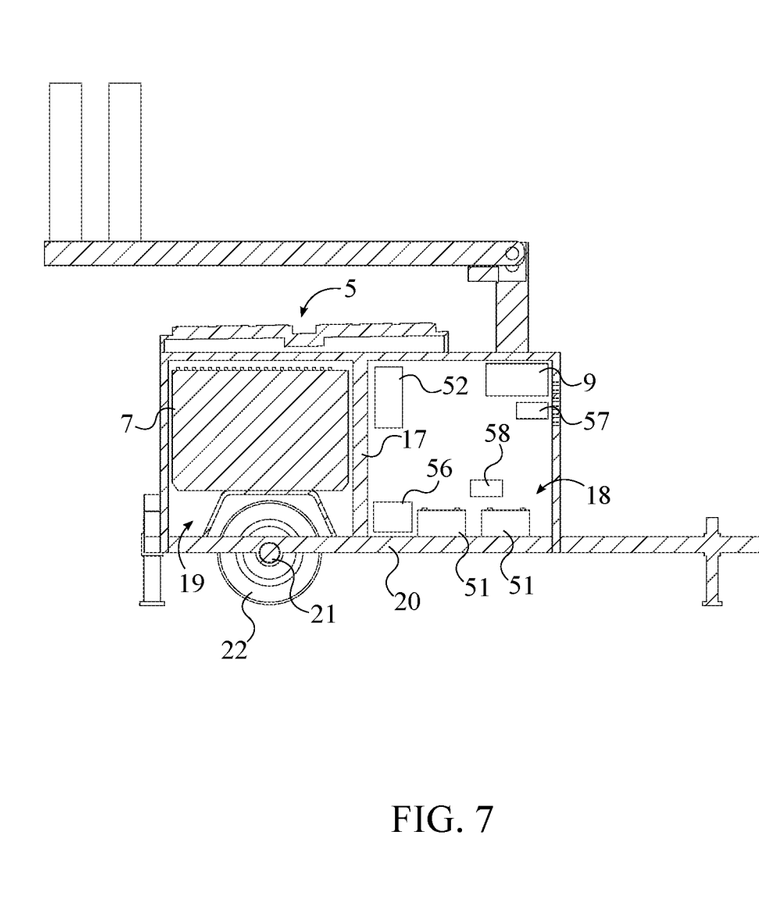
FIG. 7 is a cross section view of the present invention taken along line A-A of FIG. 6, Showing the inside components of the portable base.

In reference to FIG. 7, the insulated wall 17 is centrally positioned between the front panel 12 and the rear panel 15 and internally connected to the top panel 11 and the trailer frame 20. As a result of the insulated wall 17, the first enclosure 18 is positioned in between the front panel 12 and the insulated wall 17. The second enclosure 19 is positioned between the rear panel 15 and the insulated wall 17. The insulated wall 17 is equipped with fire resistant materials to improve the safety of the present invention. Since the primary power source 5 is mainly positioned within the first enclosure 18 and the secondary power source 7 is positioned within the second enclosure 19, the insulated wall 17 acts as a protective barrier between the primary power source 5 and the secondary power source 7 separating the both power sources to reduce any kind of fire hazards within the present invention.

In reference to FIG. 7, the trailer frame 20 functions as the platform for the housing so that the trailer frame 20 is able to secure the housing. The trailer frame 20 comprises an axle assembly 21, a pair of wheels 22, a hitch connector 13, a front stabilizing jack 14, and a pair of rear stabilizing jacks 16. The axle assembly 21 and the pair of wheels 22 assist the present invention to transport from one location to another. More specifically, the axle assembly 21 is mounted to the trailer frame 20 opposite of the front panel 12 and the rear panel 15. The pair of wheels 22 is mounted to the axle assembly 21 from each end, where the pair of wheels 22 is positioned parallel to the first lateral panel 23 and the second lateral panel 24. The portable base may also comprise a license plate, brake lights, signal lights, and other necessary components that making the present invention street legal for transporting purposes.

Figure 5:
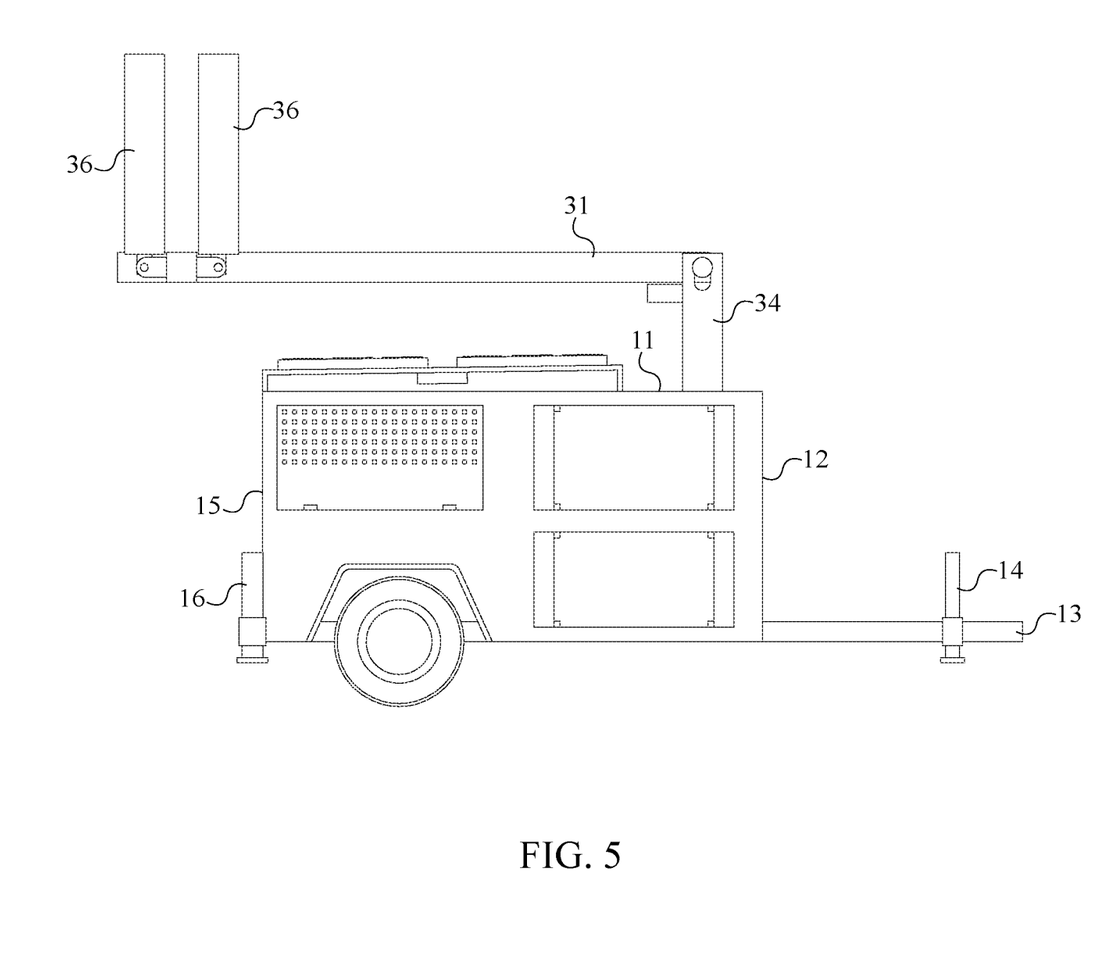
FIG. 5 is a left view of the present invention showing the light tower in a downed (transit) position.
Figure 6:
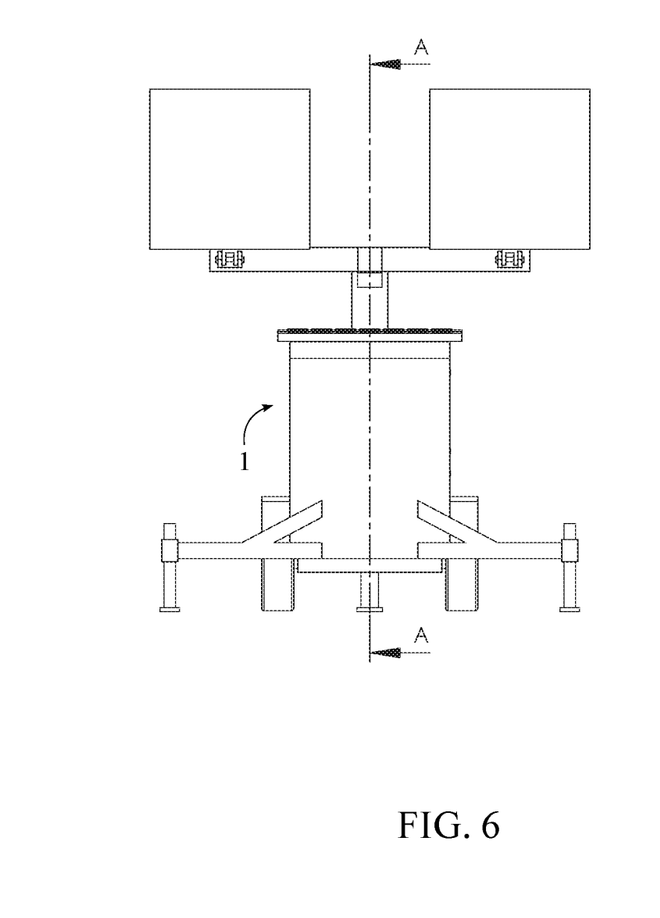
FIG. 6 is a rear view of the present invention, showing the plane upon which a cross sectional view is taken shown in FIG. 7.

In reference to FIG. 5, the hitch connector 13 is centrally positioned outside from a bottom edge of the front panel 12. The hitch connector 13 is laterally connected to the trailer frame 20 and extended outward from the front panel 12. The hitch connector 13 allows the present invention to be hooked to a vehicle so that the present invention can be easily transported. The front stabilizing jack 14 is perpendicularly connected to the hitch connector 13 and positioned away from the front panel 12. Since the present invention is only equipped with a single pair of wheels 22, the present invention requires the front stabilizing jack 14 to support the frontend of the present invention. The front stabilizing jack 14 extends toward the ground surface so the portable base 1 can be stationed parallel to the ground surface. During transportation, the front stabilizing jack 14 is pulled upward toward the hitch connector 13 so the front stabilizing jack 14 does not make contact with the ground surface. The pair of rear stabilizing jacks 16 is perpendicularly connected to the trailer frame 20 and positioned external to the rear panel 15. The pair of rear stabilizing jacks 16 is also oppositely positioned of each other across the trailer frame 20 so that the weight can be equally distributed within the pair of rear stabilizing jacks 16. More specifically, the pair of rear stabilizing jacks 16 supports the backend of the present invention and the weight of the portable base 1 is evenly distributed within the pair of rear stabilizing jacks 16 so the present invention can be stationed parallel to the ground surface. During transportation, the pair of rear stabilizing jacks 16 is pulled upward toward the trailer frame 20 so the pair of rear stabilizing jacks 16 does not make contact with the ground surface.

Figure 3:
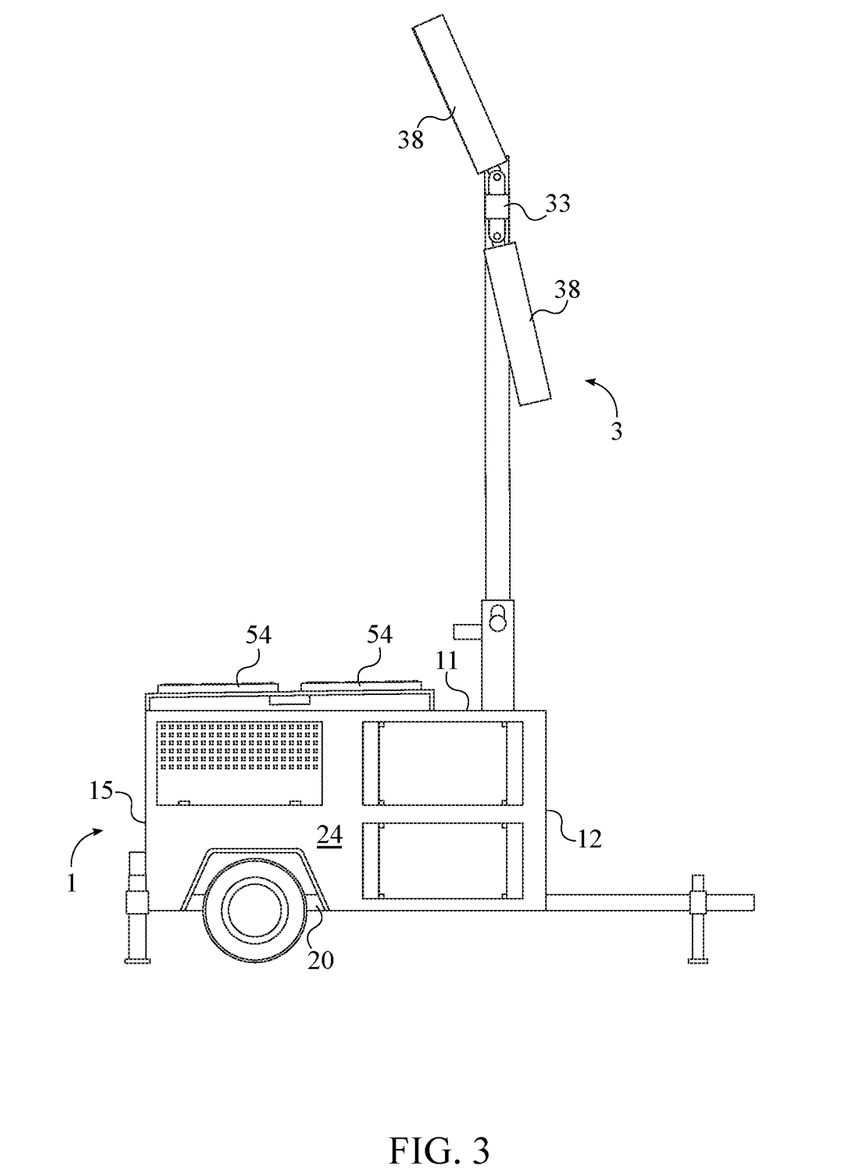
FIG. 3 is a left view of the present invention.
Figure 4:
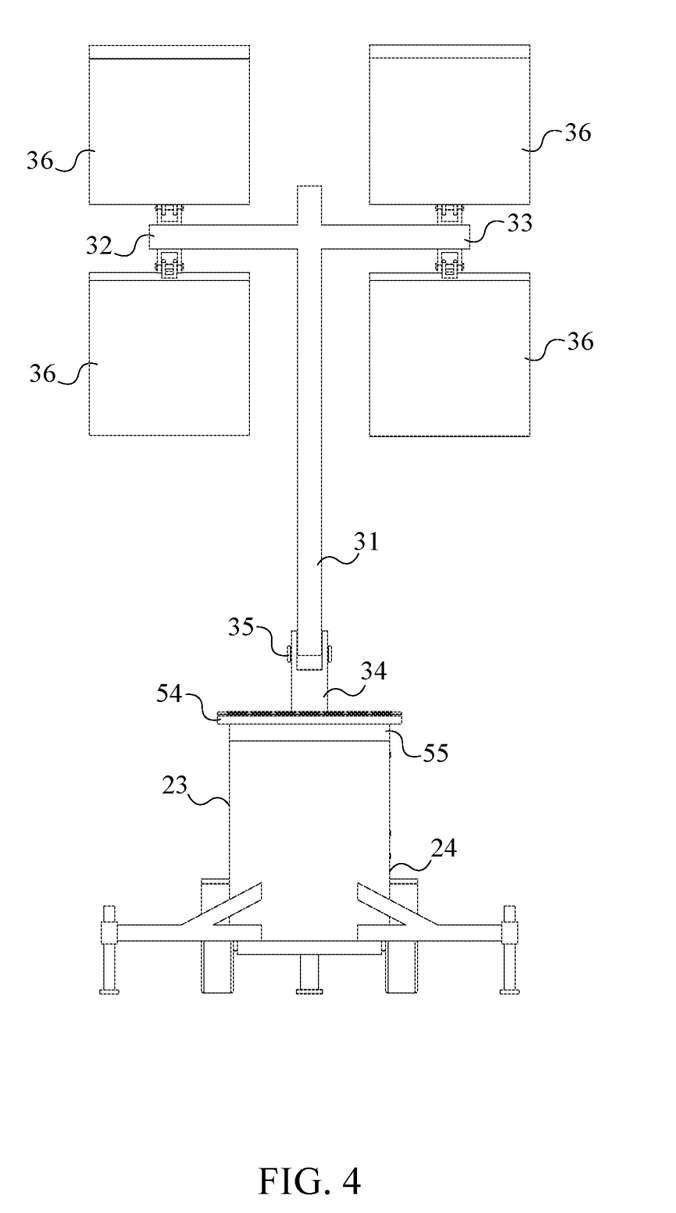
FIG. 4 is a rear view of the present invention.

In reference to FIG. 3 and FIG. 4, the light panel arm 3 provides the necessary height and the structure for the plurality of light panels 36 as the light panel arm 3 is positioned atop the top panel 11. The light panel arm 3 comprises a telescopic arm 31, a vertical arm 34, a connecting pin 35, and a light emitting diode (LED) driver 39 in addition to the plurality of light panels 36. The vertical arm 34 is perpendicularly and externally connected to the top panel 11 from an end so that the telescopic arm 31 can be hingedly connected to the vertical arm 34 by the connecting pin 35. As a result, the telescopic arm 31 is able to selectively moves from zero degrees to ninety degrees around the connecting pin 35 and about a free end of the vertical arm 34. More specifically, the telescopic arm 31 can be configured into an up position and a downed position wherein the up position is perpendicular to the top panel 11 and the downed position is parallel to the top panel 11. The telescopic arm 31 is moved into the downed position during transportation and storage of the present invention so the light panel arm 3 and its components can be protected. The telescopic arm 31 comprises a first lateral arm 32 and a second lateral arm 33. The first lateral arm 32 and the second lateral arm 33 that extend outward from the telescopic arm 31. More specifically, the first lateral arm 32 and the second lateral arm 33 are perpendicularly connected to the telescopic arm 31. The first lateral arm 32 and the second lateral arm 33 are positioned opposite of the vertical arm 34 in such a way that the first lateral arm 32 is adjacently positioned with the first lateral panel 23 and the second lateral arm 33 is adjacently positioned with the second lateral panel 24.

Figure 8:
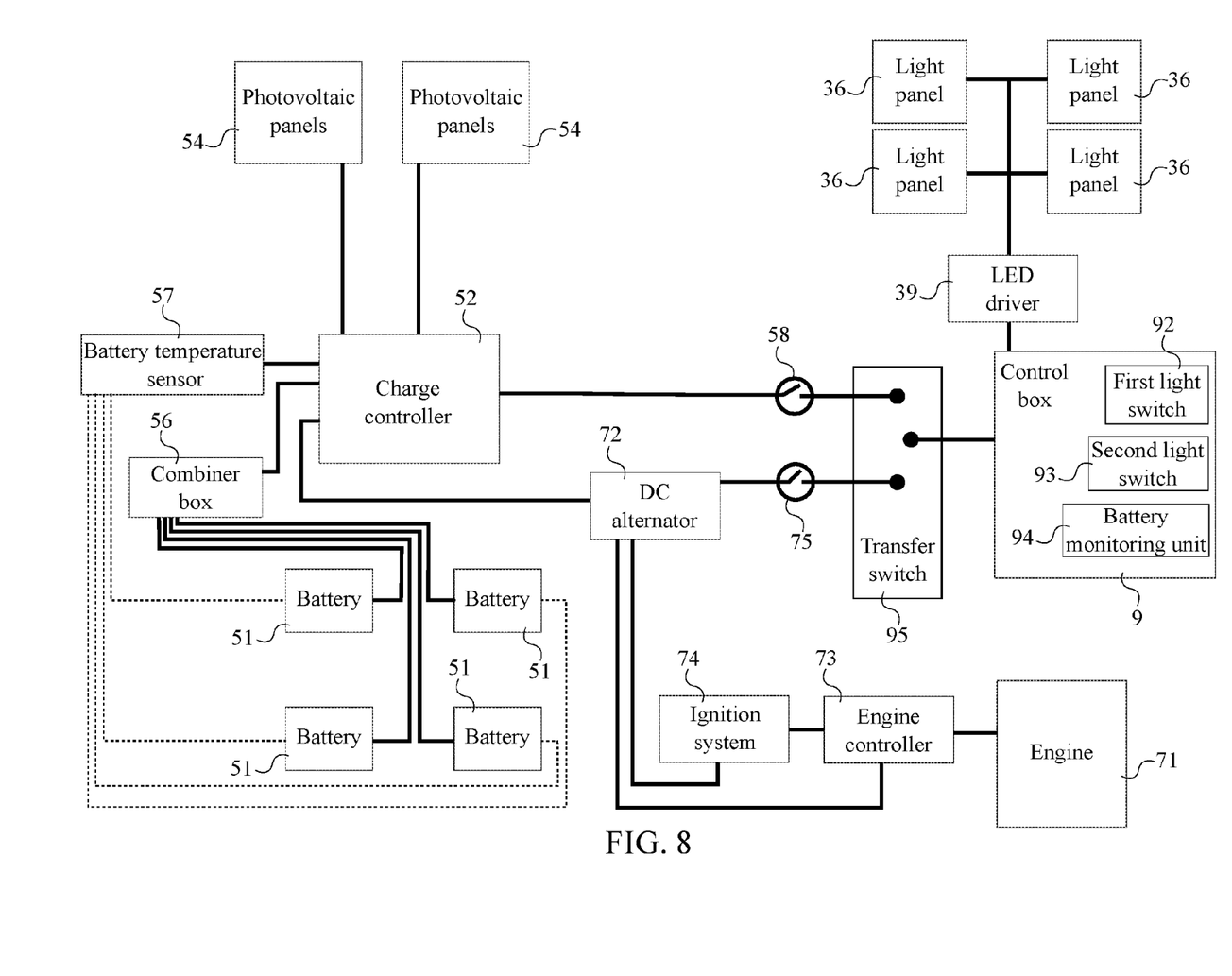
FIG. 8 is an electrical schematic view between the primary power source, the secondary power source, the light panel arm, and the control box.

In reference to FIG. 8, the present invention preferably utilizes light emitting diode (LED) light panels as the plurality of light panels 36 for increased illumination and efficiency. The plurality of light panels 36 is adjacently positioned with the first lateral arm 32 and the second lateral arm 33. More specifically, a first set of lights 37 from the plurality of light panels 36 is hingedly mounted to the first lateral arm 32 while a second set of lights 38 from the plurality of light panels 36 is hingedly mounted to the second lateral arm. The plurality of light panels 36 can be tilted up and down so the plurality of light panels 36 is able to aim a given location. The plurality of light panels 36 is generally tilted away from the top panel 11 during transportation to protect the plurality of light panels 36 from outside element. The plurality of light panels 36 is electrically connected to the control box 9 by an insulated conduit line for the functionality. However, the plurality of light panels 36 can be only operated when the telescopic arm 31 is configured to be in the up position. The LED driver 39 is an electrical device that regulates the power to the plurality of light panels 36. The LED driver 39 responds to the changing needs of the plurality of light panels 36 by providing a constant quantity of power to the plurality of light panels 36 as its electrical properties change with temperature. As a result, the first set of lights 37 and the second set of lights 38 are electrically connected to the LED driver 39 to match the electrical characteristics of the plurality of light panels 36.

Power distribution of the present invention is accomplished by the primary power source 5 and the secondary power source 7. All the electrical connections of the primary power source 5 and the secondary power source 7 are completed with the insulated conduit lines. Since the primary power source 5 and the secondary power source 7 are electrically connected to the control box 9, the plurality of light panels 36 can be individually operated through the primary power source 5 and the secondary power source 7 by utilizing a transfer switch 95 of the control box 9 as the transfer switch 95 can be a manual switch or an automatic switch.

Figure 1:
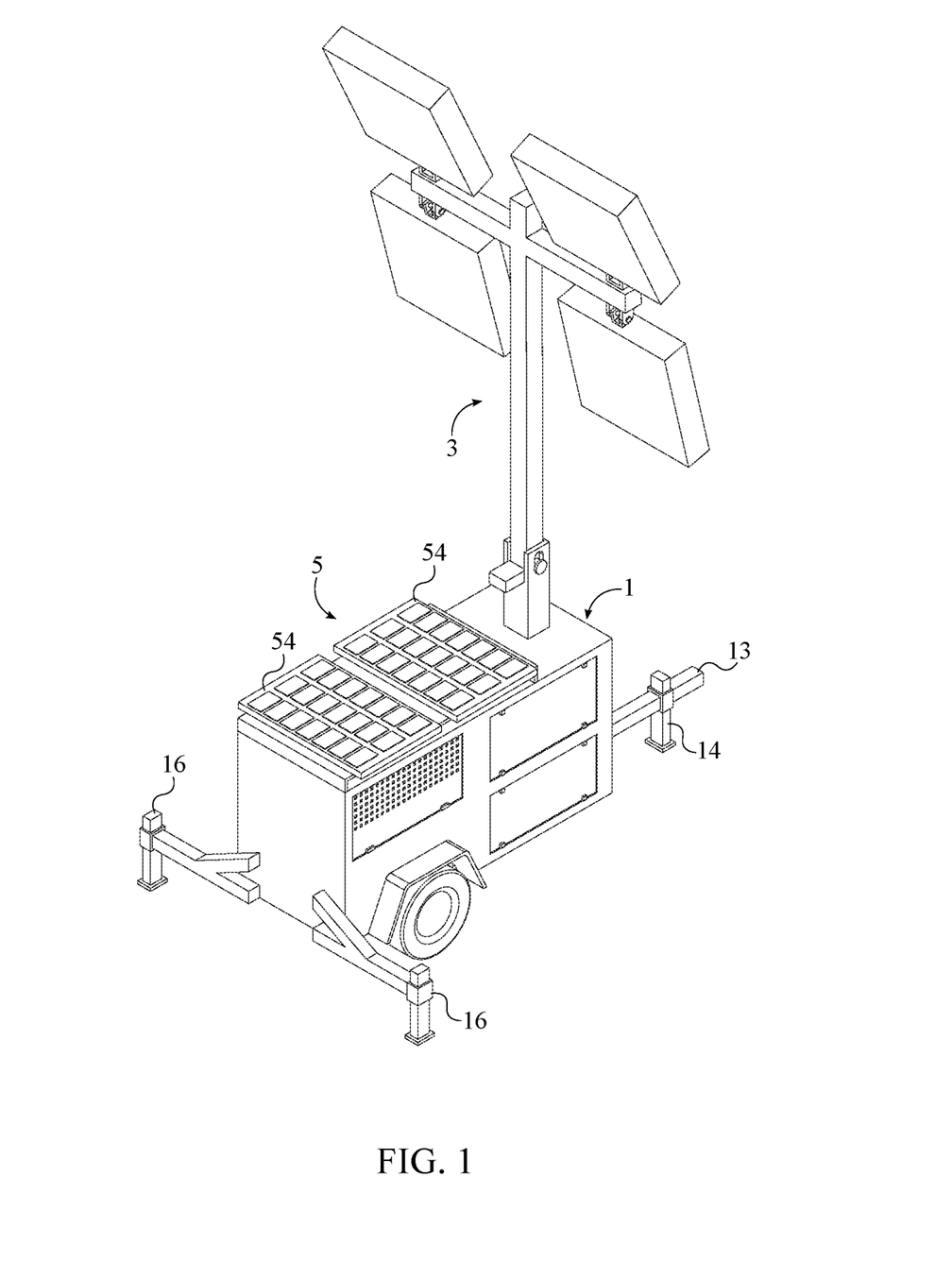
FIG. 1 is a perspective view of the present invention.
Figure 2:
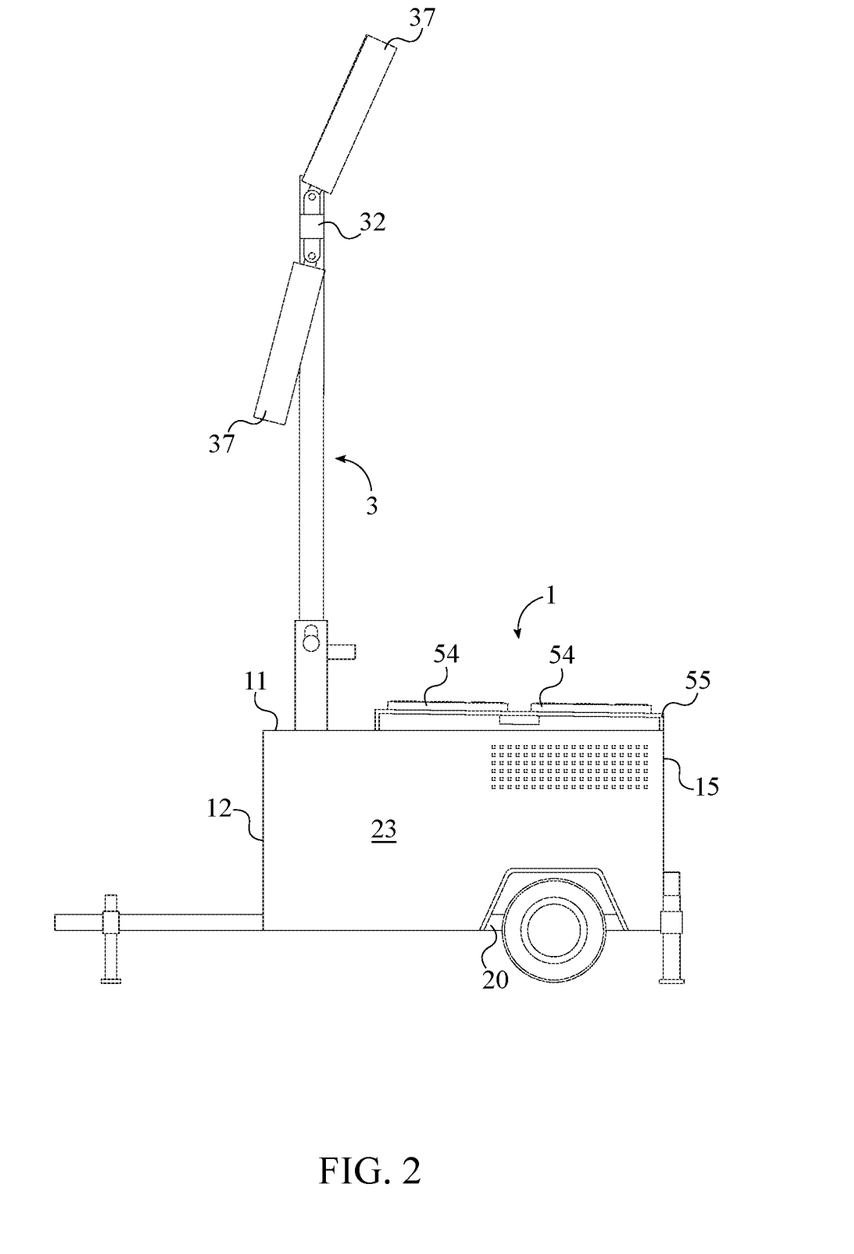
FIG. 2 is a right view of the present invention.

In reference to FIG. 1, FIG. 7, and FIG. 8, the primary power source 5 comprises a plurality of batteries 51, a charge controller 52, a plurality of photovoltaic panels 54, a combiner box 56, a battery temperature sensor 57, and a primary power switch 58. The plurality of photovoltaic panels 54 converts solar energy into direct current (DC) electricity within the present invention and comprises a connecting frame 55. More specifically, the plurality of photovoltaic panels 54 is adjacently mounted to the connecting frame 55 as the connecting frame 55 is externally attached to the top panel 11. The plurality of photovoltaic panels 54 is positioned in line the connecting frame 55 and mounted with a 1% slope from the front panel 12 to the rear panel 15. The plurality of photovoltaic panels 54 can also be mounted side by side. However, side by side mounting results the plurality of photovoltaic panels 54 to further overhang from the top panel 11. If the plurality of photovoltaic panels 54 overhangs from the first lateral panel 23 and the second lateral panel 24, it is recommended that the portable base 1 width to be enlarged for protection and structural purposes. Each of the photovoltaic panels 54 should be at least mono crystal (60 cell) 280 watts. The plurality of photovoltaic panels 54 is electrically connected to the charge controller 52. The charge controller 52 limits the rate which DC electricity is added to or drawn to prevent overdrawn or overcharge of the plurality of batteries 51. The plurality of batteries 51 is electrically connected to the charge controller 52 through the combiner box 56. More specifically, the combiner box 56 is an electrical component which combines multiple sets of wires from the plurality of batteries 51 into a single set of wires (positive, negative, and ground). The combiner box 56 is preferably made of sheet metal or fiberglass. As a result, the plurality of photovoltaic panels 54 is able absorb solar radiation and converts solar energy into DC electricity. Then the DC electricity is transferred through the charge controller 52 and then to the combiner box 56 so that the plurality of batteries 51 can be charged. The battery temperature sensor 57 is electrically connected between the plurality of batteries 51 and the charge controller 52 so that the temperature of the plurality of batteries 51 can be monitored through the charge controller 52 to extend the lifespan of the plurality of batteries 51. The primary power switch 58 is electrically connected with the charge controller 52, wherein the primary power switch 58 electrically connects the primary power source 5 with the transfer switch 95. The plurality of batteries 51, the charge controller 52, the combiner box 56, the battery temperature sensor 57, and the primary power switch 58 are positioned within the first enclosure so that the operator of the present invention can easily access these component when necessary.

The secondary power source 7 is a fuel powered generator that can be powered by gasoline, diesel, propane, or clean diesel. Since propane and clean diesel maintain maximum clean energy efficiency, they are the recommendation as the fuel resources of the fuel powered generator. In reference to FIG. 7 and FIG. 8, the secondary power source 7 comprises an engine 71, a direct current (DC) alternator 72, an engine controller 73, an ignition system 74, and a secondary power switch 75. The engine 71, the DC alternator 72, the engine controller 73, the ignition system 74, and the secondary power switch 75 are positioned within the second enclosure so that the operator of the present invention can easily separate the two different power sources.

The engine 71 is electrically connected to the ignition system 74, where the ignition system 74 electrically connected to the control box 9 through the engine controller 73. The DC alternator 72 is operatively coupled with the engine 71 and electrically connected to the secondary power switch 75. The secondary power source 7 can be either activated through the transfer switch 95 or the engine controller 73. More specifically, the secondary power switch 75 electrically connects with the transfer switch 5 in order to activate the secondary power source 5 through the secondary power switch 75. This method is mainly utilized upon the discretion of the operator. However, the secondary power source 7 can also be activated through the control box 9 as the engine controller 73 is electrically connects with the control box 9. This method is recognized as an automated system within the present invention and only utilized when the primary power source 5 is depleted and no longer able to power the plurality of light panels 36.

The present invention can be used in night construction situations, events, utility works, emergency situations, or any kind of general lowlight operations. The operator can easily control the present invention through the control box 9. Since the plurality of photovoltaic panels 54 charges the plurality of batteries 51 during the daytime, the plurality of light panels 36 can be activated during nighttime through the primary power source 5 or the secondary power source 7. For example, if the plurality of batteries 51 drains during operation, the operator can manually turn-off the primary power switch 58 and turn-on the secondary power switch 75. Then the secondary power source 7 is able to power the plurality of light panels 36. In another situation: the plurality of batteries 51 may not be charged on a cloudy day due to the lack of solar radiation. Since there is not enough power generated within the primary power source 5, the present invention can be powered from the secondary power source 7. The secondary power source 7 can also be utilized to power other power tools while the plurality of light panels 36 is powered by the primary power source 5. The simultaneous operation of the plurality of light panels 36 and the standalone generator improves the efficiency of the present invention compared to traditional light towers.

In reference to FIG. 7, the control box 9 is positioned within the portable base 1, specifically the first enclosure 18, to control the functionalities of the present invention. The control box 9 comprises a first light switch 92, a second light switch 93, and a battery monitoring unit 94, and a transfer switch 95. The first light switch 92, the second light switch 93, the battery monitoring unit 94, and the transfer switch 95 are positioned within the control box 9 and accessible to the operators of the present invention.

The first light switch 92 and the second light switch 93 separately operates the first set of lights 37 and the second set of lights 38 within the present invention. More specifically, the primary power switch 58 is electrically connected with the first light switch 92 and the second light switch 93 through the transfer switch 95. The secondary power switch 75 is electrically connected with the first light switch 92 and the second light switch 93 through the transfer switch 95. The first set of lights 37 is electrically connected with the first light switch 92 through the LED driver 39 so that the first set of lights 37 can be selectively activated through the control box 9. Similarly, the second set of lights 38 is electrically connected with the second light switch 93 through the LED driver 39 so that the second set of lights 38 can be selectively activated through the control box 9. The charge controller 52 is electrically connected with the battery monitoring unit 94. The battery monitoring unit 94 monitors the energy level of the plurality of batteries 51 and displays it through the control box 9. The control box 9 may optionally comprise an axillary outlet for power tools and a timer for the plurality of light panels 36.

Since the primary power source 5 drastically reduces the air and noise pollution, the present invention is an earth, and human, friendly device which could gain LEED (leadership in energy and environmental design) points from the U.S. Green Building Council as it may create a healthy working environment. The present invention is also an efficient solution for the rising fuel cost because of the low fuel consumption of the present invention compared to traditional light towers. When the present invention is powered from the primary power source 5, noise level is drastically reduced compared to the traditional light towers. Because of the reduced noise level in the present invention, the present invention can be used in locations such as, residential areas, active hospitals, occupied hotels, concerts, and many other places where the noise levels need to be maintained at lower levels.

Although the invention has been explained in relation to its preferred embodiment, it is to be understood that many other possible modifications and variations can be made without departing from the spirit and scope of the invention as hereinafter claimed.

What is claimed is:

1. A solar and fuel powered portable light tower comprises,
    a portable base;
    a light panel arm;
    a primary power source;
    a secondary power source;
    a control box;
    the light panel arm being hingedly connected to a top panel of the portable base;
    the primary power source being positioned on the top panel and within a first enclosure of the portable base;
    the secondary power source being positioned with a second enclosure of the portable base;
    the primary power source and the secondary power source being electrically connected with a plurality of light panels of the light panel arm through the control box;
    the control box being positioned within the first enclosure;
    the control box comprises a first light switch, a second light switch, a battery monitoring unit, and a transfer switch;
    the plurality of light panels includes a first set of lights, a second set of lights, and a light emitting diode (LED) driver;
    a primary power switch of the primary power source being electrically connected with the first light switch and the second light switch through the transfer switch;
    a secondary power switch of the secondary power source being electrically connected with the first light switch and the second light switch through the transfer switch;
    the first set of lights being electrically connected with the first light switch through the LED driver;
    the second set of lights being electrically connected with the second light switch through the LED driver; and
    the battery monitoring unit being electrically connected with a charge controller of the primary power source.

2. The solar and fuel powered portable light tower as claimed in claim 1 comprises,
    the portable base further comprises a front panel, a rear panel, an insulated wall, a trailer frame, a first lateral panel, and a second lateral panel;
    the front panel being connected to the trailer frame;
    the rear panel being connected to the trailer frame, opposite of the front panel;
    the top panel being connected to the front panel and the rear panel, opposite the trailer frame;
    the first lateral panel and the second lateral panel being oppositely positioned of each other along the top panel;
    the first lateral panel and the second lateral panel being connected to the top panel, the front panel, and the rear panel;
    the insulated wall being centrally positioned between the front panel and the rear panel;
    the insulated wall being internally connected to the top panel and the trailer frame;
    the first enclosure being positioned in between the front panel and the insulated wall; and
    the second enclosure being positioned in between the rear panel and the insulated wall.

3. The solar and fuel powered portable light tower as claimed in claim 2 comprises,
    the trailer frame comprises a hitch connector and a front stabilizing jack;
    the hitch connector being laterally connected to the trailer frame;
    the hitch connector being adjacently positioned with the front panel; and
    the front stabilizing jack being perpendicularly connected to the hitch connector.

4. The solar and fuel powered portable light tower as claimed in claim 2 comprises,
    the trailer frame comprises a pair of rear stabilizing jacks;
    the pair of rear stabilizing jacks being perpendicularly connected to the trailer frame;
    the pair of rear stabilizing jacks being oppositely positioned of each other across the trainer frame; and
    the pair of rear stabilizing jacks being externally positioned with the rear panel.

5. The solar and fuel powered portable light tower as claimed in claim 2 comprises,
    the trailer frame comprises an axle assembly and a pair of wheels;
    the axle assembly being mounted to the trailer frame, opposite the front panel and the rear panel;
    the pair of wheels being mounted to the axle assembly from each end; and
    the pair of wheels being positioned parallel to the first lateral panel and the second lateral panel.

6. The solar and fuel powered portable light tower as claimed in claim 1 comprises,
    the light panel arm comprises a telescopic arm, a vertical arm, a connecting pin, and a light emitting diode (LED) driver;
    the telescopic arm comprises a first lateral arm and a second lateral arm;
    the vertical arm being perpendicularly and externally connected to the top panel;
    the telescopic arm being hingedly connected to the vertical arm by the connecting pin;
    the first lateral arm being adjacently positioned with a first lateral panel of the portable base;
    the second lateral arm being adjacently positioned with a second lateral panel of the portable base;
    the first lateral arm and the second lateral arm being perpendicularly connected to the telescopic arm, opposite of the vertical arm;
    a first set of lights from the plurality of light panels being hingedly mounted to the first lateral arm;
    a second set of lights from the plurality of light panels being hingedly mounted to the second lateral arm; and the first set of lights and the second set of lights being electrically connected to the LED driver.

7. The solar and fuel powered portable light tower as claimed in claim 6, wherein the telescopic arm is selectively moves in between a downed position and an up position around the connecting pin.

8. The solar and fuel powered portable light tower claimed in claim 1 comprises,
the primary power source comprises a plurality of batteries, a charge controller, a battery temperature sensor, a plurality of photovoltaic panels, a combiner box, and a primary power switch;
the plurality of photovoltaic panels being electrically connected to the charge controller;
the plurality of batteries being electrically connected to the charge controller through the combiner box;
the battery temperature sensor being electrically connected between the plurality of batteries and the charge controller; and
the charge controller being electrically connected to the primary power switch.

9. The solar and fuel powered portable light tower as claimed in claim 8 comprises,
the plurality of photovoltaic panels comprises a connecting frame;
the connecting frame being externally attached to the top panel; and
the plurality of photovoltaic panels being adjacently mounted to the connecting frame.

10. The solar and fuel powered portable light tower as claimed in claim 8, wherein the plurality of batteries, the charge controller, the combiner box, the battery temperature sensor, and the primary power switch being positioned within the first enclosure.

11. The solar and fuel powered portable light tower as claimed in claim 1 comprises,
the secondary power source comprises an engine, a direct current (DC) alternator, an engine controller, an ignition system, and a secondary power switch;
the engine being electrically connected to the ignition system;
the ignition system being electrically connected to the control box through the engine controller;
the DC alternator being operatively coupled with the engine; and
the DC alternator being electrically connected to the secondary power switch.

12. The solar and fuel powered portable light tower as claimed in claim 11, wherein the engine, the DC alternator, the engine controller, the ignition system, and the secondary power switch being positioned within the second enclosure.

* * * * *